US012101528B2

(12) United States Patent
Leigh et al.

(10) Patent No.: US 12,101,528 B2
(45) Date of Patent: Sep. 24, 2024

(54) CLIENT DEVICE SWITCHING TO LOW LATENCY CONTENT

(71) Applicant: Synamedia Limited, Staines upon Thames (GB)

(72) Inventors: Anthony Leigh, Workingham (GB); Thomas Paul Burnley, Hampshire (GB)

(73) Assignee: Synamedia Limited, Maidenhead (GB)

( * ) Notice: Subject to any disclaimer, the term of this patent is extended or adjusted under 35 U.S.C. 154(b) by 0 days.

(21) Appl. No.: 18/077,841

(22) Filed: Dec. 8, 2022

(65) Prior Publication Data

US 2024/0196049 A1 Jun. 13, 2024

(51) Int. Cl.
*H04N 21/44* (2011.01)
*H04N 21/24* (2011.01)

(52) U.S. Cl.
CPC ... *H04N 21/44004* (2013.01); *H04N 21/2401* (2013.01)

(58) Field of Classification Search
CPC ..................... H04N 21/44004; H04N 21/2401
See application file for complete search history.

(56) References Cited

U.S. PATENT DOCUMENTS 6,330,286 B1 * 12/2001 Lyons .............. H04N 21/44016 375/240.26
8,935,425 B2 * 1/2015 Minder .............. H04N 21/8456 725/86
10,591,984 B2 3/2020 Thorwirth et al.
11,223,664 B1 1/2022 Burnley et al.
2004/0207723 A1 * 10/2004 Davis ..................... H04N 7/148 348/E7.056
2005/0080915 A1 * 4/2005 Shoemaker ......... H04L 65/1101 709/231
2005/0120038 A1 * 6/2005 Jebb ................... H04N 21/2402 707/999.102
2005/0172028 A1 * 8/2005 Nilsson ............ H04N 21/44016 375/E7.014
2005/0190794 A1 * 9/2005 Krause ............. H04N 21/26216 370/485

(Continued)

OTHER PUBLICATIONS

Extended European Search Report dated Apr. 26, 2024, European Application No. 23207414.6, pp. 1-10.

(Continued)

*Primary Examiner* — James R Sheleheda
(74) *Attorney, Agent, or Firm* — Fernando & Partners, LLP

(57) ABSTRACT

Techniques for switching a client device to play low latency content are described. In accordance with various embodiments, the client device switching method is performed at a device (e.g., a client device) with a processor and a non-transitory memory. The client device detects a request for a user interface (UI) while playing a media content item from a buffer and sends to a server the request and status of playing the media content item from the buffer. The client device then receives from the server a switch point determined by the server based at least in part on the status and the requested UI. The client device further determines whether the buffer has sufficient UI frames rendered by the server at the switch point. Upon determining that the buffer has sufficient UI frames, the client device switches to playing the UI frames from the buffer at the switch point.

20 Claims, 9 Drawing Sheets

(56) References Cited

U.S. PATENT DOCUMENTS

2006/0174021 A1* 8/2006 Osborne ................. H04L 65/65 709/230
2006/0174026 A1* 8/2006 Robinson ........... H04N 21/4782 709/231
2008/0181221 A1* 7/2008 Kampmann ............ H04L 65/80 370/389
2009/0100483 A1* 4/2009 McDowell .............. G06F 9/451 725/109
2010/0091888 A1* 4/2010 Nemiroff ............. H04N 19/115 375/E7.154
2010/0189124 A1* 7/2010 Einarsson ........ H04N 21/44016 370/431
2011/0066673 A1* 3/2011 Outlaw ................. H04L 65/613 709/231
2012/0117225 A1* 5/2012 Kordasiewicz .. H04N 21/44004 709/224
2012/0117265 A1* 5/2012 Xu ................... H04N 21/44016 709/231
2012/0185570 A1* 7/2012 Bouazizi ............ H04N 21/6377 709/219
2012/0284804 A1* 11/2012 Lindquist ................ G06F 21/10 726/29
2012/0297081 A1* 11/2012 Karlsson ........ H04N 21/440227 709/231
2013/0160146 A1* 6/2013 Kaiser .............. H04N 21/63345 726/30
2014/0047484 A1* 2/2014 McMahon ....... H04N 21/44224 725/61
2014/0192893 A1* 7/2014 Sullivan ........... H04N 21/44016 375/240.25
2014/0375894 A1* 12/2014 Kellerman ......... H04N 21/4302 348/731
2015/0074818 A1* 3/2015 Watson .............. H04N 21/4668 726/27
2015/0230002 A1* 8/2015 Brockmann ......... H04N 21/233 725/126
2017/0085928 A1* 3/2017 Visscher .......... H04N 21/44004
2018/0234724 A1* 8/2018 Ström ................ H04N 21/4325
2023/0052666 A1* 2/2023 Schmidt ............. H04N 21/8543

OTHER PUBLICATIONS

Simon Waller, “DASH-IF-CR-Low_Latency-Live-rl”, Digital Video Broadcasting, No. r2, May 30, 2019, pp. 1-20.

* cited by examiner

600

Upon determining the buffer has insufficient frames, retrieve from a cache a video to fill the buffer, play the video from the buffer until a next switch point indicated in the status, ~660
and insert the UI frames into the buffer at the next switch point Establish a data channel with the server in response to detecting the request; and send to the server the request and the status and receiving from the server the switch point ~670 via the data channel The media content item is received from the server via a channel, different from the data channel; and a license for decrypting the media content item is obtained via the data channel ~672

The server is configured to: (a) create multiple DRM license sessions, including a first DRM license session and a second DRM license session; (b) associate the first DRM ~680 license session with a first license request from the server, wherein the server uses the first license when generating the UI frames; and (c) associate the second DRM license session with a second license request from the device Receive a license from the server, wherein the server obtains the license from ~682 the second DRM license session

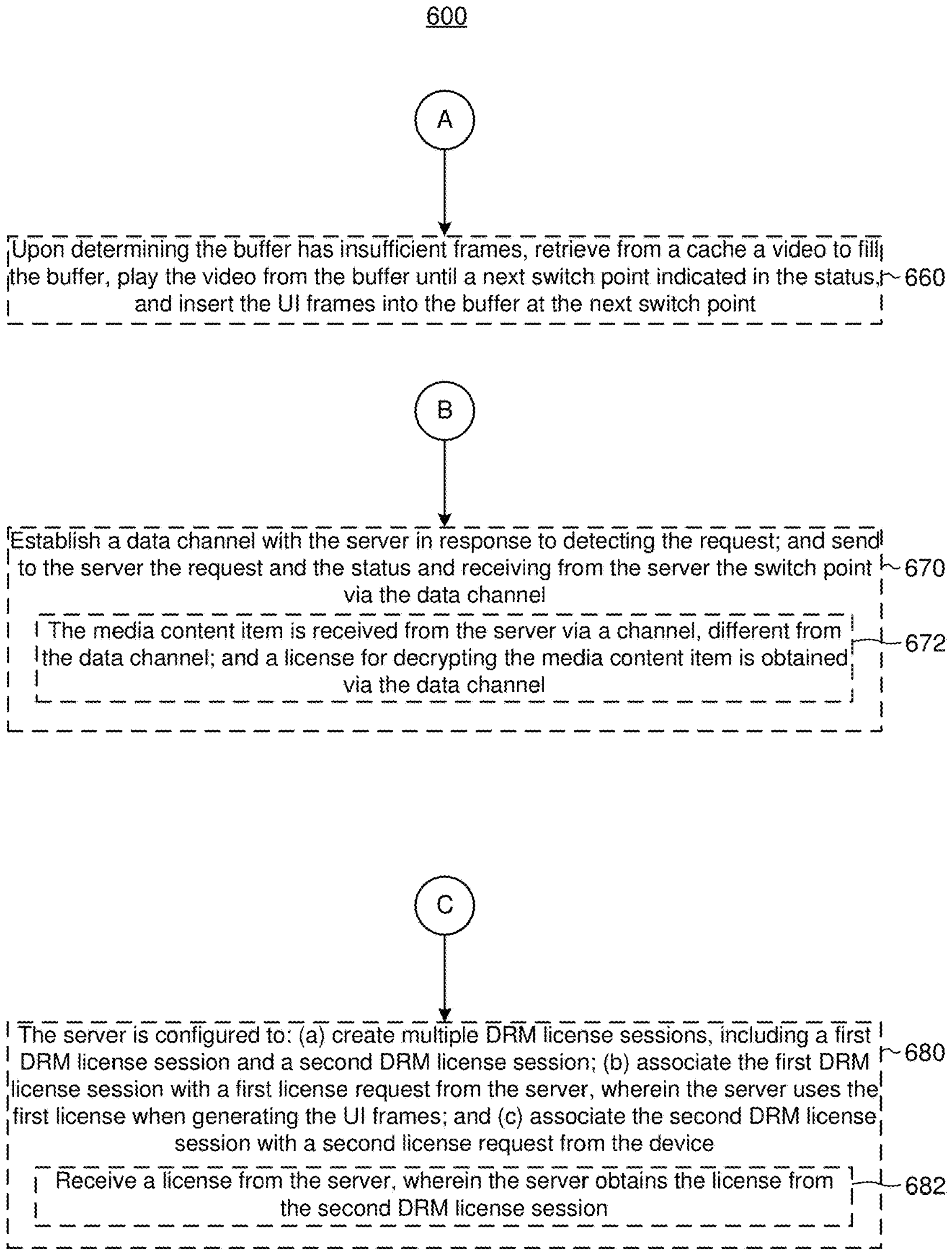

Figure 6B

CLIENT DEVICE SWITCHING TO LOW LATENCY CONTENT

TECHNICAL FIELD

The present disclosure relates generally to multimedia content delivery and, more specifically, to switching to low latency content on a client device.

BACKGROUND

When delivering video applications to client devices, many systems move applications to the cloud to realize cost savings. In such systems, applications in the cloud render user interfaces (UIs) for client devices before delivering cloud-rendered UI video streams to client devices. As a result, client devices are responsible for simply displaying the videos, e.g., playing video-on-demand (VOD), linear content videos, or application videos. Without having to consume client device resources for running applications, such solutions utilize the server processing power and control the application execution environment to allow media content delivery to low cost client devices.

Currently, cloud TV UI rendering solutions face several challenges. Among the content delivered to client devices, adaptive bitrate (ABR) videos (e.g., movies and other streaming content commonly referred to as buffered content) typically use a relatively large buffer on client devices to allow for retries. In contrast, low latency user interface (UI) videos (also referred to hereinafter as the application video streams or application videos) are typically delivered over a low latency video protocol that is different from the protocol for delivering the buffered content. Seamless switching between buffered content and low latency content is thus one main challenge faced by cloud TV UI rendering solutions. For example, while a user is watching a movie, the user presses the home key on a remote control. When switching from ABR playback of the movie to playing application video(s) responsive to the user input, the low latency time-frame requirement, e.g., switching within 250 ms or less, has to be met for an uninterrupted user experience. In another example, to seamlessly switch between the buffered content and the low latency content, a frame-accurate switching requires that the TV UI is presented at the point of transition, e.g., overlaying the positional information on top of a relevant video frame when pausing a video in response to a key press.

BRIEF DESCRIPTION OF THE DRAWINGS

So that the present disclosure can be understood by those of ordinary skill in the art, a more detailed description may be had by reference to aspects of some illustrative embodiments, some of which are shown in the accompanying drawings.

FIGS. 6A and 6B are flowcharts illustrating a client device switching method, in accordance with some embodiments.

Figure 1:
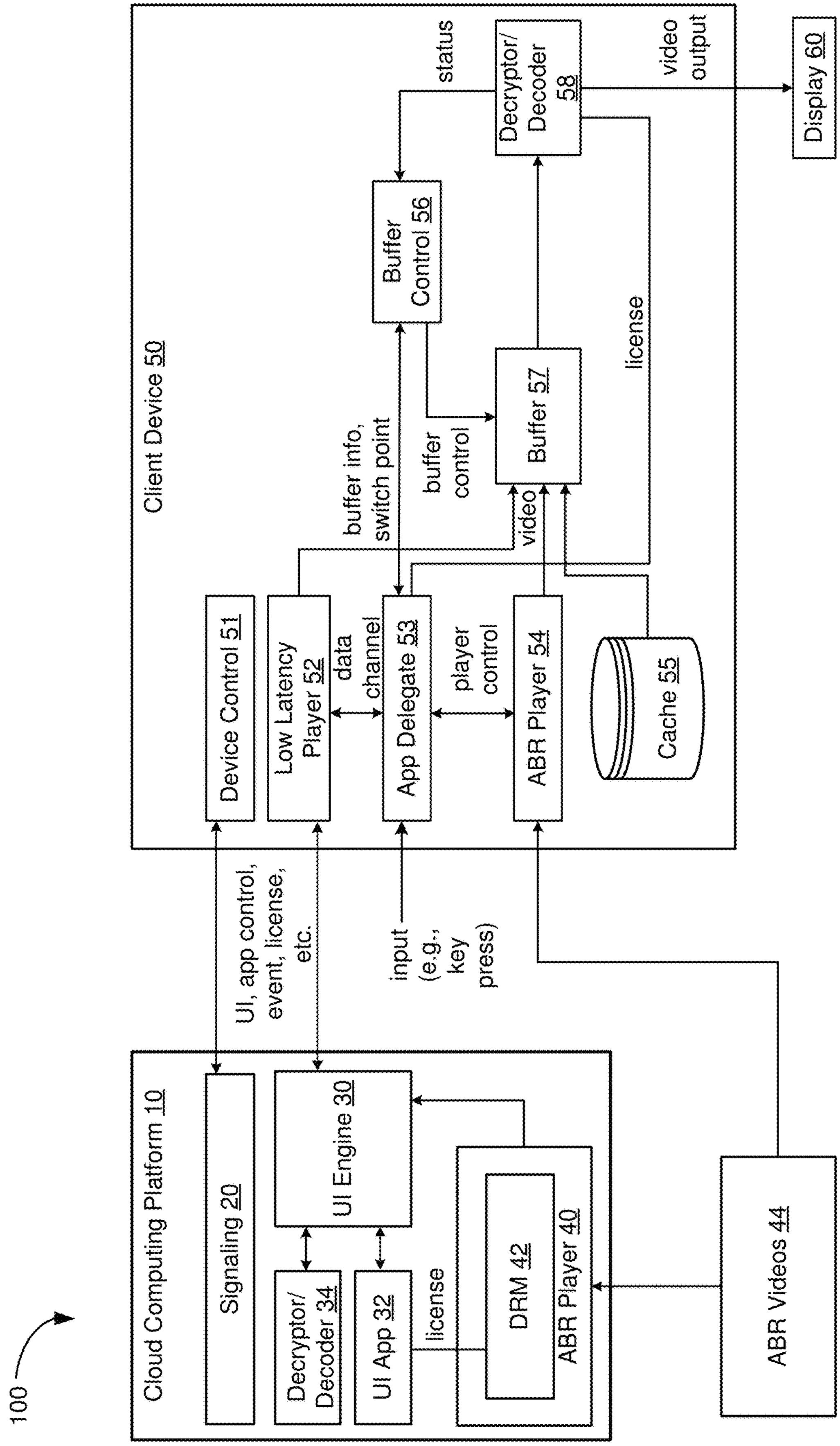
FIG. 1 is a block diagram of an exemplary multimedia content delivery system for client device switching to low latency content, in accordance with some embodiments.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method, or device. Finally, like reference numerals may be used to denote like features throughout the specification and figures.

DESCRIPTION OF EXAMPLE EMBODIMENTS

Numerous details are described in order to provide a thorough understanding of the example embodiments shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices, and circuits have not been described in exhaustive detail so as not to obscure more pertinent aspects of the example embodiments described herein.

Overview

Techniques described herein allow a client device to consume videos from an adaptive bitrate (ABR) streaming source and a TV user interface (UI) application via different transport mechanisms and seamlessly transition from ABR videos to application videos. In some embodiments, the client device establishes a data channel to a UI application in the cloud over one connection, e.g., a Web Real-Time Communication (WebRTC) connection for secure real time communication. The client device then uses the data channel to pass commands (e.g., key presses) between an application delegate on the client device and the main UI application in the cloud. Further, in some embodiments, the client device has a buffer control unit for controlling the placement of video data from either ABR or UI source into a playout buffer and obtaining client presentation conditions and buffer status. In some embodiments, the data channel is also used by the client device to report to the cloud the client presentation conditions and status so that the cloud can determine a switch point and a switch policy for the client. The application delegate and the buffer control unit on the client device thus ensure seamless switching from ABR to UI videos according to the switch point and the switch policy specified by the cloud. In some embodiments, to further ensure continuous playback, the client device uses a cache to hold small video segments to play in the event of video unavailability from any source.

In accordance with various embodiments, a client device switching method is performed at a device (e.g., a client device) with a processor and a non-transitory memory. The method includes detecting a request for a user interface (UI)

while playing a media content item from a buffer. The method further includes sending to a server the request and status of playing the media content item from the buffer. The method also includes receiving from the server a switch point determined by the server based at least in part on the status and the requested UI. The method additionally includes determining whether or not the buffer has sufficient UI frames rendered by the server in response to the request for the UI at the switch point. The method further includes switching to playing the UI frames from the buffer at the switch point upon determining the buffer has sufficient UI frames.

EXAMPLE EMBODIMENTS

A client device disclosed herein addresses the aforementioned challenges in previously existing cloud TV user interface (UI) rendering solutions by using an application delegate to communicate with the cloud through low latency transport mechanism and coordinate with a buffer control unit to facilitate the switch point and policy selection by the cloud. Due to the way videos are encoded and streamed, some frames in the sequence are complete frame pictures (e.g., I-frames or random access points (RAPs)), while some other frames are dependent upon the complete frame pictures (e.g., P-frames and B-frames). Consequently, it is impossible to simply switch video source cleanly from one to another at any point in the video flow. In some embodiments, the playback changes on the boundary of an I-frame to allow the decoder to cleanly switch context. In some embodiments, based on the presentation conditions and the status of the client device reported by the buffer control unit via the application delegate, the cloud determines the switch point and switch policy for the client device. According to the switch point and the switch policy specified by the server, the buffer control unit on the client device manipulates pointers in the buffer to ensure continuous playback, e.g., inserting UI video frames into the buffer at the switch point specified by the cloud or according to the switch policy.

Reference is now made to FIG. 1, which is a block diagram of an exemplary multimedia content delivery system 100 for client device switching to low latency content in accordance with some embodiments. The media content (also referred to hereinafter as "multimedia content", "media content item(s)", "media asset", or "content") can include any multimedia data, such as visual data, audio data, and/or text, etc. In some embodiments, the content delivery system 100 includes a cloud computing platform 10 on the server side for delivering multimedia content and a client side for receiving the multimedia content. In some embodiments, the multimedia content delivered by the cloud computing platform 10 includes adaptive bitrate (ABR) videos (also known as buffered content) and/or low latency user interface (UI) videos (also known as low latency content, UI videos, application video streams, or application videos). To prepare the media content, the cloud computing platform 10 can apply any number of audio and video packaging techniques following any standards, such as H.264, Opus, Advanced Video Coding (AVC), or the High Efficiency Video Coding (HEVC) standard, Dynamic Adaptive Streaming over HTTP (DASH), and/or HTTP Live Streaming (HLS), etc. In some embodiments, the cloud computing platform 10 includes a signaling unit 20 for establishing connection(s) with a device control unit 51 on the client side. Through the established connection(s), user inputs, application controls, media content, event notifications, and/or licenses are exchanged between the server and client side.

In some embodiments, a UI engine 30 on the cloud computing platform 10 receives user inputs from the client side and communicates with the client side using a low latency data transport mechanism, e.g., over a Web Real-Time Communication (WebRTC) connection. In some embodiments, such user inputs include pressing a button, voice inputs to a voice recorder, and/or user inputs detected by a sensor, etc. In some embodiments, the UI engine 30 and/or a UI application 32 render, compose, and/or encode TV UIs into UI video segments and/or frames in response to the user inputs and sends UI videos (i.e., low latency content) to the client side over the WebRTC connection. In some embodiments, in addition to communicating the user inputs and the low latency content, the WebRTC connection is also used for communicating application controls (e.g., switch points and switch policies), client feedback, client status (e.g., statistical data indicating client bandwidth, buffer status, processing capacity, and/or storage capacity, etc.), encryption events (e.g., license requests), and/or content decryption licenses, etc.

In some embodiments, upon receiving request(s) indicating the user selecting a media content item, e.g., highlighting a tile in a catalog and selecting the tile representing the media content item, ABR videos 44 are delivered to the client side under the control of the UI engine 30 over a different data transport mechanism, e.g., using Real Time Transport (RTP) protocol. In some embodiments, the ABR videos 44 are delivered via a separate delivery component from the cloud computing platform 10, e.g., via a content delivery network (CDN).

In some embodiments, an ABR player 40 obtains and plays the ABR videos 44 to the UI engine 30, e.g., for determining switch points, for determining switch policies, and/or for composing UI videos. In some embodiments, the ABR videos 44 are encrypted, e.g., under the protection of a Digital Rights Management (DRM) unit 42. Though FIG. 1 illustrates the DRM unit 42 as a component in the ABR player 40, the DRM unit 42 can be integrated with the ABR player 40 or distinct from the ABR player 40 for obtaining and/or providing licenses. For example, as will be shown in FIGS. 4 and 5, the DRM unit 42 can be a distinct license server in the cloud computing platform 10 that provides licenses in response to license requests from the UI application 32.

On the client side, an exemplary client device 50 includes the device control unit 51 for negotiating connections with the signaling unit 20, a low latency player 52 for receiving and playing low latency content obtained from the UI engine 30, and an ABR player 54 for receiving and playing ABR videos. As described above, one of the challenges faced by the cloud TV UI rendering architecture is the seamless switching between ABR playback and low latency UI videos. To ensure seamless switching, in some embodiments, the client device 50 includes an application delegate 53 coupled with the low latency player 52 and the ABR player 54. In some embodiments, the application delegate 53 is configured to receive user inputs, e.g., a key press on a remote control, and sends the user inputs to the server side, e.g., utilizing the data channel between the low latency player 52 and the UI engine 30 via the WebRTC connection. In some embodiments, the application delegate 53 is also configured to receive application controls, e.g., switch points and switch policies from the server side for controlling the seamless switching between ABR playback and low latency UI videos.

Also as described above, ABR videos are typically buffered content, e.g., with a deeper buffer depth for ABR packet retries, while UI videos are typically delivered over a low latency protocol, e.g., for near real time content delivery. In some embodiments, the client device 50 includes a buffer control unit 56 coupled with the application delegate 53 to control a buffer 57 storing frames for content playout. In some embodiments, the buffer control unit 56 manipulates pointers in the buffer 57 so that the playback of the video is continuous regardless of the video source.

For example, the buffer control unit 56 maintains a pointer pointing to the accumulated ABR video frames or packets in the buffer 57 to ensure continued playouts of the ABR video. In response to a request for a TV UI, the buffer control unit 56 maintains a pointer to the accumulated application video frames or packets in the buffer 57 and switches to the playout of the low latency content when the pointer(s) indicate that frames or packets in the buffer 57 have met a required threshold for a smooth transition. In some embodiments, to further ensure continuous content delivery, the client device 50 includes a cache 55 for storing small video segments, e.g., a spinning wheel, so that in the case of video unavailability from any source during the switching, e.g., the pointer(s) indicating the frames or packets in the buffer 57 have not met a threshold, the buffer control unit 56 fills the buffer 57 with the video segments from the cache 55 according to the instructions from the application delegate 53, e.g., according to a switch policy specified by the server and received via the data channel by the application delegate 53.

In some embodiments, the buffer control unit 56 also reports to the application delegate 53 the buffer status of the buffer 57 obtained from a decryptor and decoder unit 58, e.g., current playout position, next available boundaries, buffer depth, etc. The application delegate 53 further reports such information to the UI engine 30 on the server side for determining switch points and switch policies between ABR and UI videos. According to the switch points and policies specified by the cloud computing platform 10, the buffer control unit 56 ensures a continuous source of video to the display 60 by determining whether to play incoming videos from the ABR, UI, or cached sources in the buffer 57 and how to present these video sources as a continuous stream for playback. Through the coordination of the application delegate 53 and the buffer control unit 56, the client device 50 seamlessly switches between ABR and UI videos.

In some embodiments, videos are encrypted for content protection. For example, the ABR videos 44 can be protected with digital rights management (DRM) licenses from a DRM unit 42. When composing UI videos that include ABR content, e.g., an overlay of the positional information on top of a movie, in the case of the ABR content being encrypted, the UI application 32 obtains the DRM licenses from the DRM unit 42 so that the ABR content can be decrypted by a decryptor and decoder unit 34. On the client side, in some embodiments, to playback the encrypted ABR content, the application delegate 53 receives the DRM licenses from the server side and the decryptor and decoder unit 58 then uses the keys in the DRM licenses for decryption on the client device 50 before outputting the decrypted and decoded videos to a display 60, e.g., a TV display.

As will be described in further detail below, the exemplary system 100 is different from previously existing DRM system in that two licenses are required for content delivery and consumption, with one anchored on the server side and the other anchored on the client device. Previously existing DRM systems control access and consumption of media content by anchoring one license on the server side so that the server can control which client device is authorized to decrypt and consume the content. In contrast, in the exemplary system 100, the decryptor and decoder 34 on the server side requests one license when generating UI videos for the client device 50, and the decryptor and decoder 58 on the client side requests another license when consuming videos on the client device 50. Moreover, both license requests are made through the UI application 32, which is authorized to request licenses. In some embodiments, the UI engine 30 ensures the correct license goes to either the server side or the client side by intercepting the requests and associating DRM license session objects with the requests for content protection.

Although a single UI engine 30, a single decryptor and decoder unit 34, a single UI application 32, a single ABR player 40, a single client device 50, and a single display 60 are illustrated on the cloud computing platform 10, the cloud computing platform 10 may include one or more server side platforms hosting one or more UI engines 30, e.g., a pool of UI engines, one or more decryptor and decoder units 34, e.g., one for each decoding and/or decryption standard, one or more UI applications 32, and one or more ABR players 40, e.g., a pool of ABR players, for streaming content to a plurality of client devices 50. For the sake of simplicity, the subject matter will be described hereinafter for the most part with reference to a single UI engine 30, a single decryptor and decoder unit 34, a single UI application 32, a single ABR player 40, a single client device 50, and a single display 60.

Further, one or more components and/or functions of the cloud computing platform 10, the client device 50, and the display 60 may be distributed and/or re-arranged. For example, the UI engine 30, the UI application 32, and the decryptor and decoder unit 34 can be combined or as separate and distinct units. As such, the content delivery system 100 can include more, less, and/or different elements than shown in FIG. 1. Each of the components in the content delivery system 100 can include appropriate hardware, software, and/or firmware to perform the operations attributed to the element herein. Operation(s) attributed to an element in the content delivery system 100 herein should not be considered binding and in some embodiments, other element(s) in the exemplary system 100 may additionally or alternatively perform such operation(s).

Figure 2A:
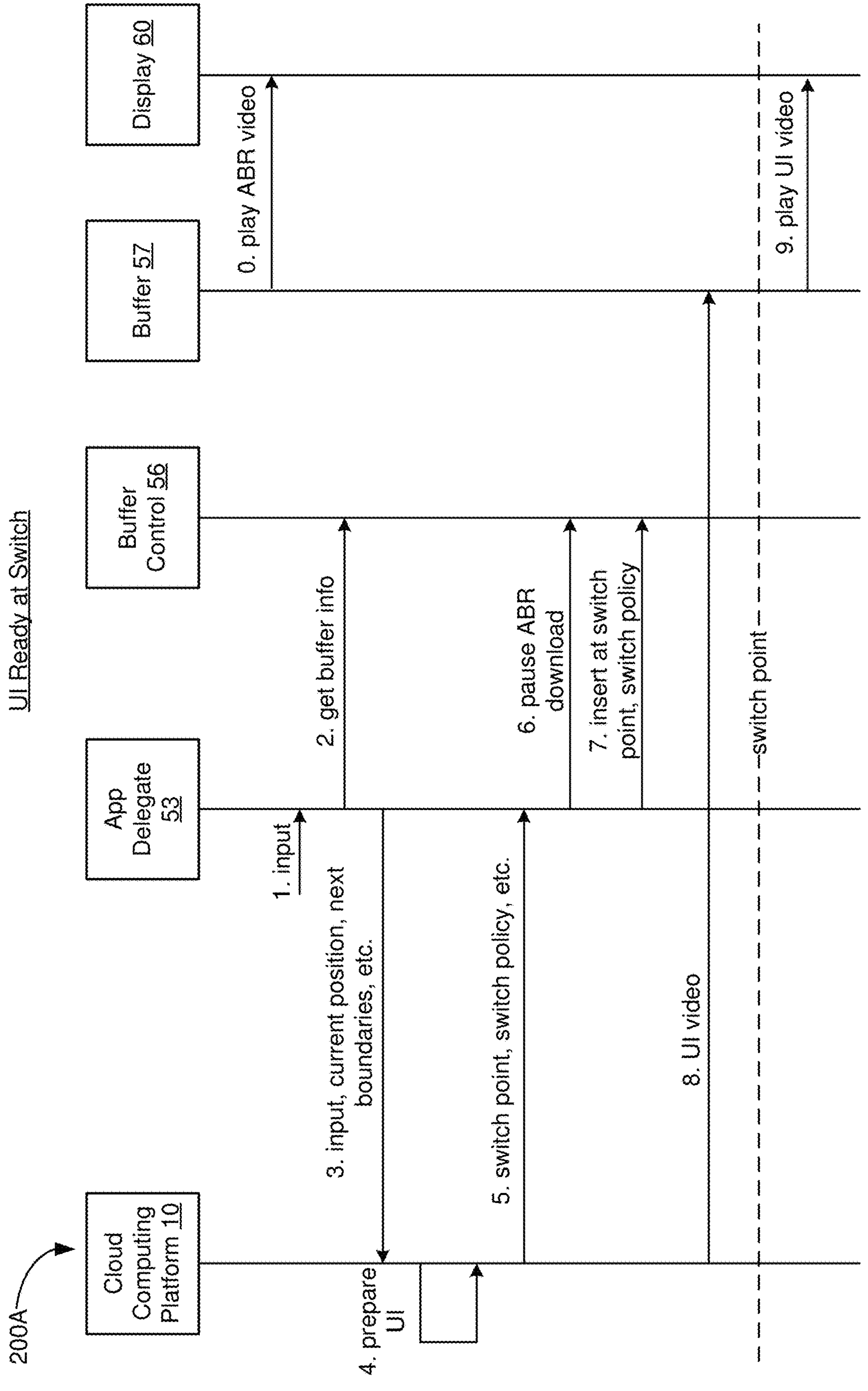
FIG. 2A is a sequence diagram illustrating client device switching to a UI video when the UI video is ready at the switch point, in accordance with some embodiments.

FIG. 2A is a sequence diagram 200A illustrating client device switching to a UI video when the UI video is ready at the switch point in accordance with some embodiments. In step 0, the client device plays ABR videos from the buffer 57 and displays on the display 60. In step 1, the application delegate 53 receives a user input, e.g., a key press, which signals a user request from the client device for a TV UI. In response to receiving the user input, in step 2, the application delegate 53 obtains buffer information from the buffer control unit 56. As shown in FIG. 1, in some embodiments, the buffer control unit 56 further receives the playback status from the decryptor and decoder unit 58, such as the current player position and the next position(s) available to switch, etc.

In step 3, the application delegate 53 indicates to the cloud computing platform 10 (e.g., the UI application 32 in FIG. 1) that the key has been pressed and supplies the playback status, such as the current ABR video play position, next boundary in ABR video such as the next I-frame, etc. In step 4, the cloud computing platform 10, e.g., the UI application 32 in FIG. 1, prepares the requested UI for the client, e.g., rendering, encoding, and/or compositing UI videos. In some embodiments, the UI video prepared by the UI application 32 (FIG. 1) includes the display of the same ABR content that was playing in step 0 at the next switch point, e.g., compositing a UI overlay on top of the ABR content.

In step 5, the cloud computing platform 10, e.g., the UI engine 30 and/or the UI application 32 in FIG. 1, determines whether a UI transition from the ABR video to the UI video is required. In some embodiments, also in step 5, in the case of requiring a UI transition, the cloud computing platform 10 identifies the next switch point and/or a switch policy to apply and signals the application delegate 53 the identified switch point and/or switch policy, e.g., via the WebRTC connection between the UI engine 30 and the low latency player 52 and through the data channel between the low latency player 52 and the application delegate 53.

In some embodiments, a switch policy is selected by the cloud computing platform 10 based on the client status obtained from the client device, such as characteristics of the client device requesting the transition (e.g., processing speed, storage space, buffering capacities of the client device, etc.), network conditions (e.g., connection speed, geographic information, the number of concurrent requests, congestions, etc.), state of the TV UI (the screen being displayed), characteristics of the UI transition (e.g., complexity of the UI, UI transition segment duration, the number of frames in the UI transition video, etc.), among others. A switch policy can specify, for example, continuing to play the ABR video, fading of video or audio for a threshold amount of time, retry transition at a new switch point, pausing the video and/or audio, etc.

In step 6, the application delegate 53 instructs the ABR player 54 (FIG. 1) to pause downloading more ABR content to free bandwidth for the UI video and sends buffer control instructions to the buffer control unit 56 to pause receiving ABR videos to the buffer 57. Additionally, in step 7, the application delegate 53 instructs the buffer control unit 56 to insert the UI content to the buffer 57 at the next switch point and/or according to the switch policy identified by the cloud computing platform 10. In step 8, the cloud computing platform 10 starts sending the UI video. For example, as shown in FIG. 1, the UI engine 30 sends the UI video to the buffer 57 via the low latency player 52 and the buffer control inserts the UI video frames into the buffer 57 at the next switch point. In step 9, the display 60 consumes the UI video from the buffer 57 and successfully transitions to the UI video at the switch point.

Figure 2B:
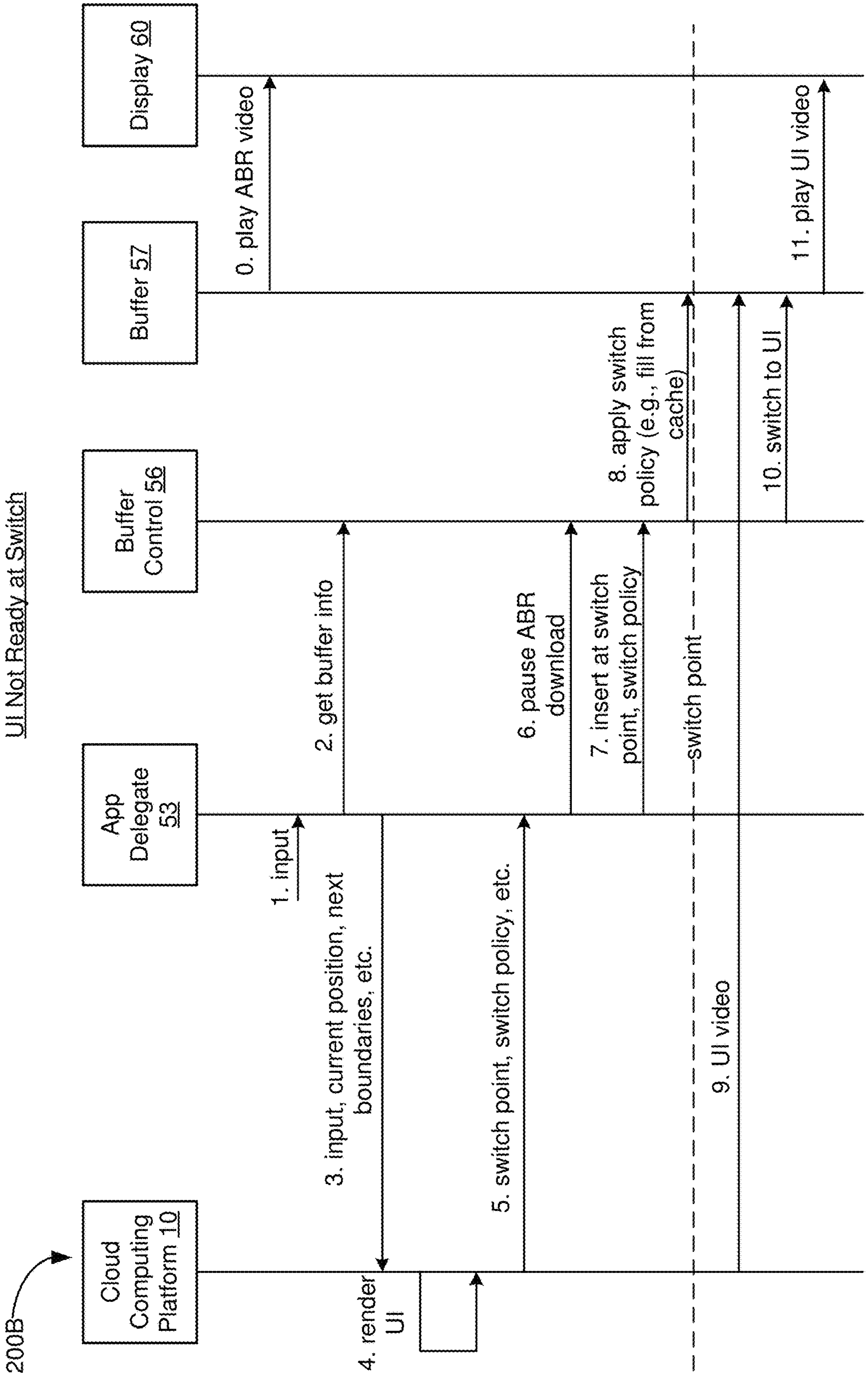
FIG. 2B is a sequence diagram illustrating client device switching to a UI video when the UI video is not ready at the switch point, in accordance with some embodiments.

FIG. 2B is a sequence diagram 200B illustrating client device switching to a UI video when the UI video is not ready at the switch point in accordance with some embodiments. In FIG. 2B, steps 0 through 7 are the same as steps 0-7 shown and described above with reference to FIG. 2A. Different from the sequence diagram 200A, even though the application delegate 53 instructs the buffer control unit 56 to insert the UI content to the buffer 57 at the next switch point, because the UI video is not sufficiently available in the buffer 57 at the switch point, e.g., due to the complexity of the UI video, the network condition, the processing capacity of the client device, etc., in step 8, the buffer control unit 56 uses the switch policy received from the server side to determine what to do, e.g., pausing playback, slowing video, fading audio, continuing ABR playout and retrying, and/or playing from the cache 55 (FIG. 1), etc. In the case of the buffer control unit 56 selecting playing from the cache as the action according to the switch policy, the buffer control unit 56 fills the buffer 57 with segments of videos from the cache 55 (FIG. 1), e.g., a spinning wheel. In step 9, when the UI video from the cloud computing platform 10 arrives at the buffer 57 later, e.g., after the designated switch point identified in step 5, the buffer control unit 56 inserts the UI video into the buffer 57 at the next switch point. In step 10, when sufficient UI video frames are available in the buffer 57, e.g., exceeding a threshold, the buffer control unit 56 switches the playback to the UI Video, and in step 11, the display 60 consumes the UI video from the buffer 57 and successfully transitions to the UI video at the next switch point.

As shown in FIGS. 2A and 2B, the client device switching is controllable by the UI engine 30 (FIG. 1) and/or the UI application 32 (FIG. 1) on the cloud computing platform 10. The cloud computing platform signals the switch point and/or the switch policy to allow for the transition control, e.g., a fade of audio, dropping in or out of brightness, slowing video, pausing at the switch point, etc. The server side control also allows the UI engine 30 (FIG. 1) and/or the UI application 32 (FIG. 1) to define the switch policy specifying what happens at the switch point in the case of the client device not being able to acquire enough UI video frames to start the playback at the selected switch point as shown in FIG. 2B. The cloud computing platform 10 thus determines and controls what is appropriate based on the context around the switching at the application level.

Figure 3:
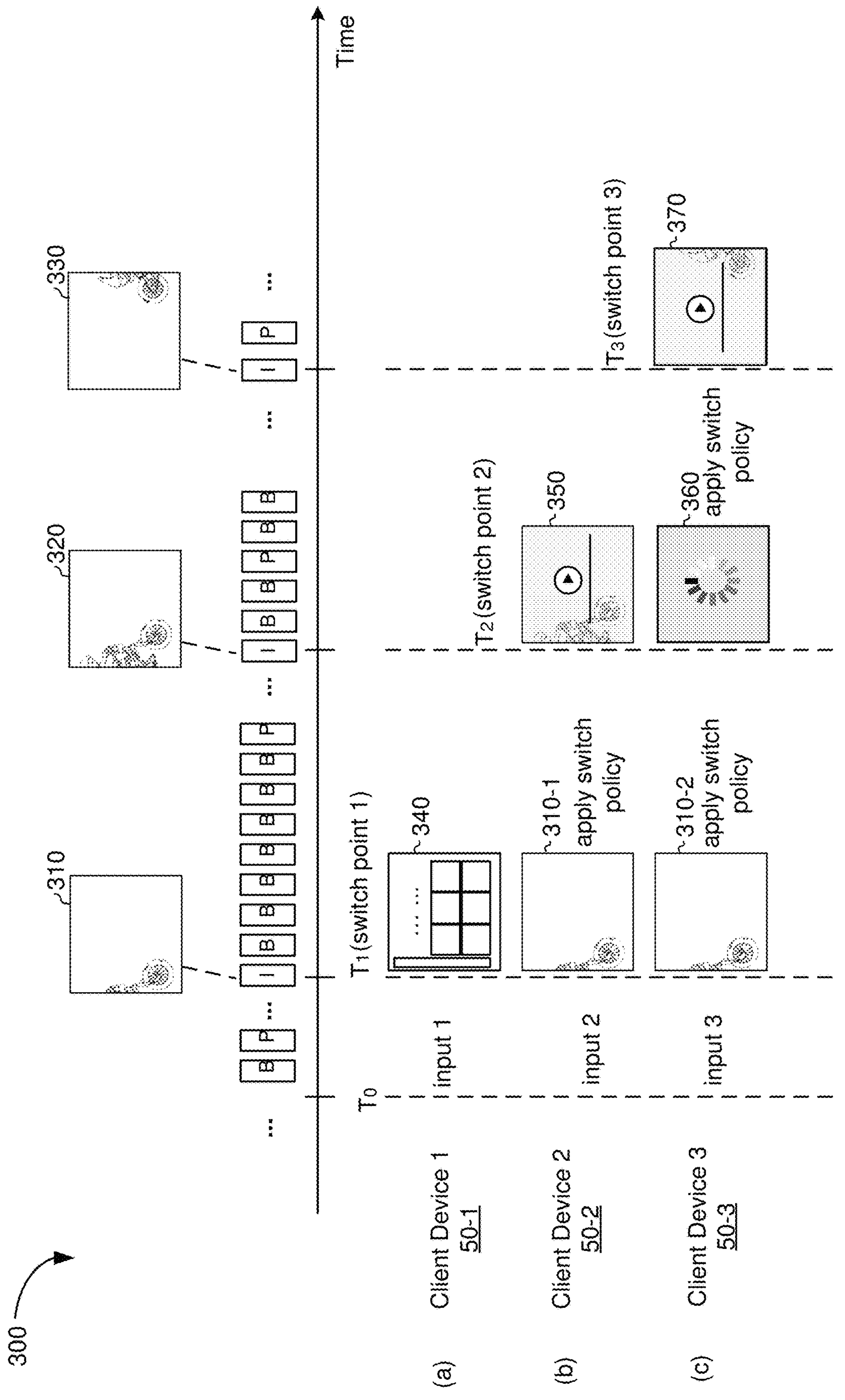
FIG. 3 is a diagram illustrating switch point determination, in accordance with some embodiments.

FIG. 3 is a diagram 300 illustrating switch point determination using the processes illustrated in FIGS. 2A and 2B in accordance with various embodiments. In some embodiments, as shown in FIGS. 2A and 2B, when a switch is necessary, e.g., in response to a key press, the client uses the buffer control unit 56 to find the next positions where a switch is possible based upon the location of the I-frames in the ABR video and provides such buffer information to the cloud computing platform 10. Also as described above with reference to FIG. 1, the UI engine 30 and/or the UI application 32 on the server side determine which one of the next positions are possible to ensure the seamless transition based on factors such as the requested UI, the current position in the ABR video, the next boundary, network conditions, client capacity, etc. In some embodiments, the UI application 32 uses the network data from the client and/or the previous switch time to estimate the time required for a good switch and then uses the estimated time to determine the type of UI video to compose and determine the switch point.

For example, client status considered by the UI application 32 for determining the switch point can include whether an overlay is requested or whether to transition to a full screen UI, where transitioning to a full screen UI with no video context requires less time to prepare and is less sensitive to a small discontinuity of playback than preparing a frame exact overlay UI transition. In another example, when preparing complex UI transitions and/or once determining a longer transition time is necessary due to network conditions, the UI engine 30 (FIG. 1) and/or the UI application 32 (FIG. 1) select a later switch point (e.g., a next I-frame or another 500 ms later) to preserve the continuity of the video playout.

In FIG. 3, at time $T_0$, while the same ABR video plays on client device 1 50-1, client device 2 50-2, and client device 3 50-3 (collectively referred to as the client devices 50), each of the client devices 50 receives a respective input for a respective TV UI, e.g., client device 1 50-1 receiving input 1, client device 2 50-2 receiving input 2, client device 3 50-3 receiving input 3. The frames in the ABR video that would be played after time $T_0$ include an I-frame 310 at time $T_1$, followed by another I-frame 320 at time $T_2$, and yet followed by another I-frame 330 at time $T_3$. Each of the client devices 50 reports to the cloud computing platform the respective input along with the status of the respective client device 50, including next available switch point(s) such as I-frames 310-330.

In some embodiments, based at least in part on the client status and the requested UI, the UI engine selects the transition characteristics appropriate for the bandwidth and/or the capacity of the client device and the switch point and switch policy corresponding to the transition. For example, the UI engine can select various transition effects, durations, and/or frames so that the bitrate of playing the transition with certain transition characteristics is no more than the bitrate allocated to the content and that the switch point is appropriate for the complexity, the duration, and the number of the UI video frames.

In the examples shown in FIG. 3, client device 1 50-1 requests transitioning to a full screen UI, e.g., a home screen. The home screen has no video context, thus requiring less time to set up and is less sensitive to a small discontinuity of playback. Accordingly, shortly after detecting input 1, client device 1 50-1 switches to a UI video frame 340 at the first available switch point, e.g., switching to displaying a UI video starting at time $T_1$ according to the switch point specified by the cloud. In another example, for client device 2 50-2, the requested UI in response to input 2 requires more complex transition effects, longer transition durations, and/or more frames, etc., and such transition effects in the UI video require more time to prepare and send. Accordingly, for client device 2 50-2, the UI engine selects the next available switch point for the transition, e.g., continuing to play the ABR video including the I-frame 310-1 at time $T_1$ and switching to a UI video frame 350 showing player control overlay at time $T_2$ according to the switch policy specified by the cloud computing platform.

In yet another example, similar to client device 2 50-2, at the first available switch point specified by the server, client device 3 50-3 continues to play the ABR video including the I-frame 310-1 at time $T_1$. Different from client device 2 50-2, following step 8 in FIG. 2B, when no video is available from either the ABR source or the low latency source at the second switch point, e.g., due to network conditions and/or buffer conditions, at time $T_2$, client device 3 50-3 plays a locally cached video 360, e.g., a spinning wheel, and accumulates UI video frames until the next available switch point. At time $T_3$, when sufficient UI video frames are available in the buffer, a UI video 370 starts playing. Accordingly, for client device 3 50-3, after displaying the spinning wheel at time $T_2$, the UI video 370 shown at time $T_3$ has the same UI overlay as the UI video 350 shown on client device 2 50-2 at time $T_2$.

In some embodiments, the client device applies more than one switch policy during the switching. For example, though not shown in FIG. 3, when no UI video is available at time $T_2$, the client device applies a retry as the switch policy according to the instructions from the server, e.g., continuing to play the ABR content, and notifies the server that the transition cannot happen at time $T_2$. In response to receiving the notification, the server selects a new switch point, e.g., at time $T_4$ corresponding to an I-frame sometime after $T_3$, and prepares the client to switch at the new switch point. $T_0$ prepare for the switching at the new switch point, the server instructs the client device to play a locally cached video, e.g., displaying a spinning wheel at time $T_3$, before switching to the UI video at time $T_4$. In such embodiments, the switch policies specified by the server and applied by the client device include a first switch policy of retrying the ABR video and a second switch policy of playing the cached video on a second attempt.

Figure 4:
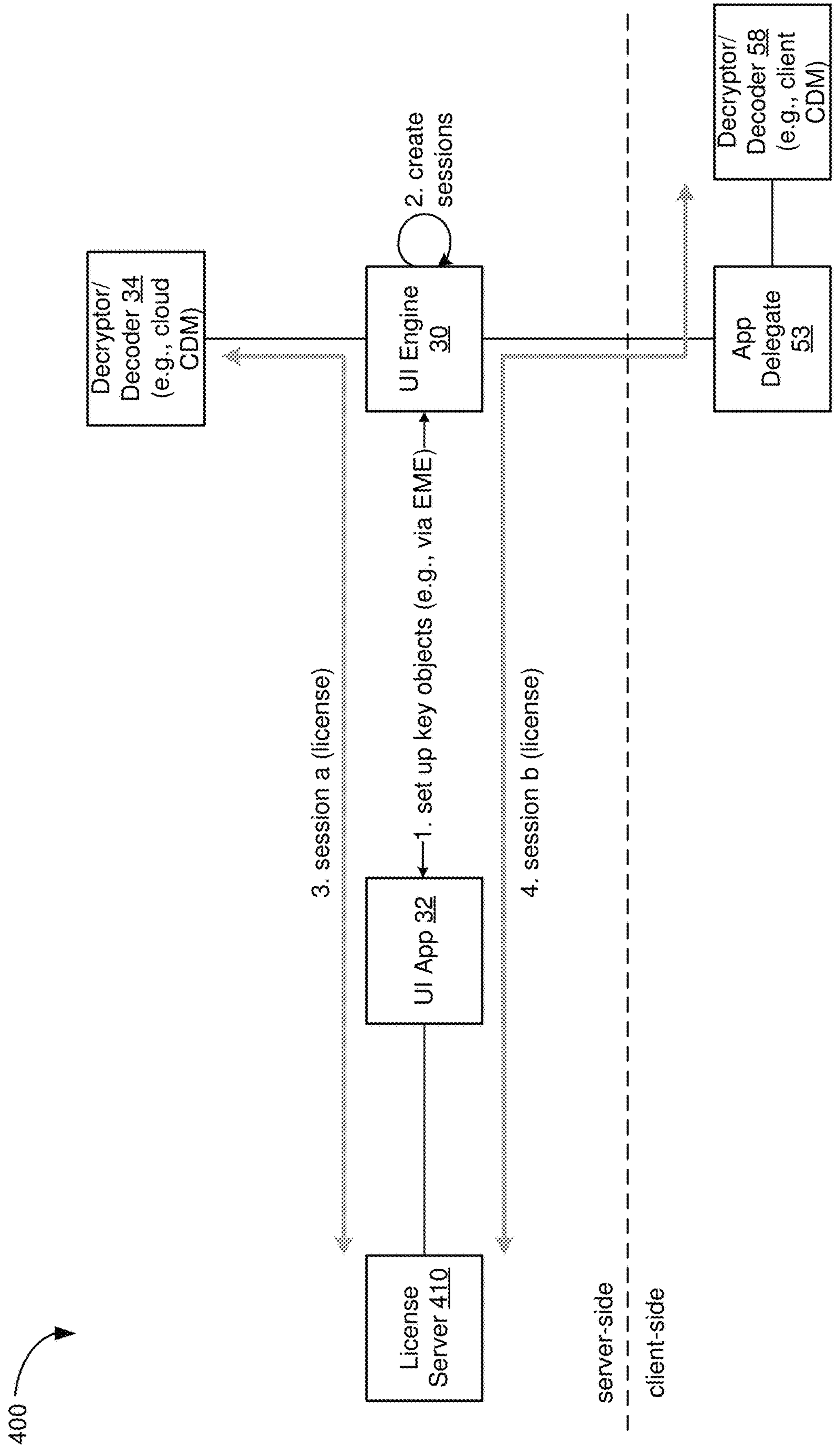
FIG. 4 is a diagram illustrating license handling during client device switching to low latency content, in accordance with some embodiments.

FIG. 4 is a diagram 400 illustrating license handling during client device switching to low latency content in accordance with some embodiments. In many media content delivery systems using DRM for protection, a client device player obtains media content, parses manifests, extracts the key identifiers (IDs) from the manifests, and makes requests to a DRM license server for keys. Often in such system, a module (e.g., a Content Decryption Module (CDM)) coordinates with the player to create the license request, decrypts, and decode the content. Also in such systems, a secure way for the CDM to acquire the DRM license from the DRM license server and to facilitate the decryption and decoding is via Encrypted Media Extensions (EMEs) application programing interface (API).

In the context of cloud TV UI rendering, different from conventional content protection architecture that uses one CDM on the client side, as shown in FIG. 4, two CDMs are used in the system to facilitate the secure communication of license requests and licenses. In some embodiments, the server side includes a cloud CDM, e.g., as part of the decryptor and decoder unit 34, and the client side includes a client CDM, e.g., as part of the decryptor and decoder unit 58. In some embodiments, the EME API running in the UI engine 30 initiates the process by setting up key objects in step 1.

Also different from conventional single CDM content protection architecture, the UI application 32 receives two license requests and sends both requests to a license server 410, e.g., as part of the DRM unit 42 (FIG. 1) or a separate server on the cloud computing platform 10 (FIG. 1). $T_0$ track the origin of the license requests, in some embodiments, the UI engine 30 creates creating multiple DRM license session objects (also referred to hereinafter as the session objects) in step 2, e.g., calling session.GenerateRequest( ), so that a respective session object is associated with a corresponding CDM when the UI engine 30 passing license requests and licenses. Further, in some embodiments, the UI engine 30 intercepts the EME calls that are first directed to the cloud CDM and then to the client CDM via the application delegate 53. $T_0$ ensure that the correct license goes to the correct CDM, the UI engine 30 associates the first session object, e.g., session object a, to the license request from the cloud CDM in step 3 and associates the second session object, e.g., session object b, to the license request from the client CDM in step 4. As shown in FIG. 4 and as will be described in further detail below with reference to FIG. 5, using the EME to message both the cloud CDM and over the data channel of the WebRTC channel to the client CDM, the licenses are securely transported and tied to the correct CDM.

Figure 5:
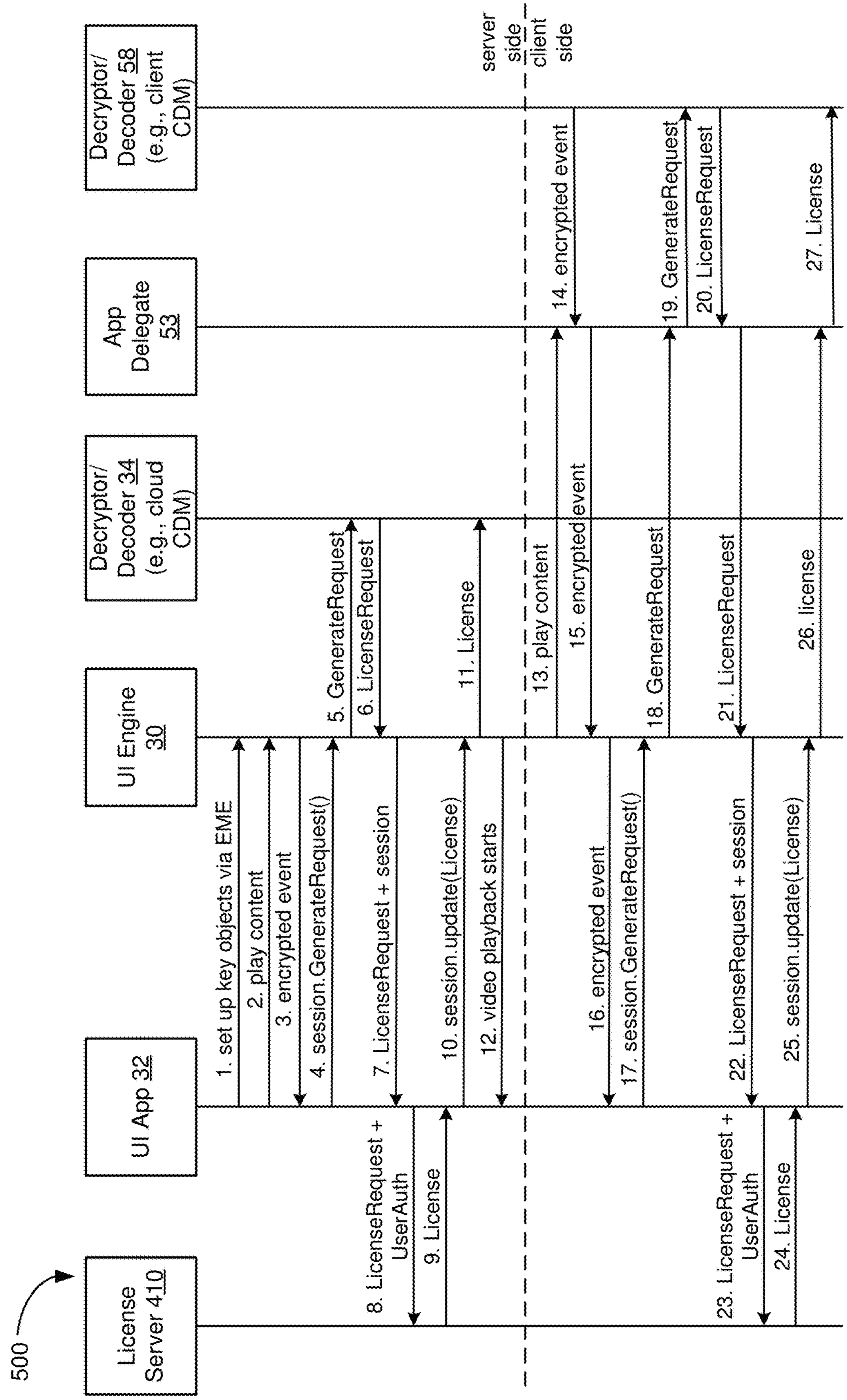
FIG. 5 is a sequence diagram illustrating license handling during client device switching to low latency content, in accordance with some embodiments.

FIG. 5 is a sequence diagram 500 illustrating license handling during client device switching to low latency content in accordance with some embodiments. In FIG. 5, a dashed horizontal line splits the process between the server side and the client side. On the server side, when preparing certain UI videos associated with encrypted ABR content, e.g., overlaying a UI element such as a player control on top of a DRM protected ABR video, the cloud CDM in the decryptor and decoder unit 34 obtains the license from the license server 410. On the client side, when any videos associated with encrypted ABR content, the client CDM in the decryptor and decoder unit 58 obtains the license from the license server 410. Both requests are intercepted by the UI engine and both licenses are requested by the UI application 32 on the server side.

In step 1, as described above with reference to FIG. 4, the UI application 32 requests the EME API running in the UI engine 30 to set up key objects. Once the key objects are set, when the UI application 32 plays encrypted ABR content for compositing UI videos and/or for determining a switch point and a switch policy in step 2, the UI engine 30 detects the ABR content being encrypted and notifies the UI application 32 of the encrypted event in step 3. In response to receiving the notification, the UI application 32 composes an EME message for generating a license request in step 4 and creates a first session object (e.g., session object a in FIG. 4) to be associated with the license request. The UI engine 30 also intercepts the EME message, requests the cloud CDM on the decryptor and decoder unit 34 to generate the license request in step 5, and obtains the license request generated by the cloud CDM in step 6. In step 7, the UI engine 30 packages the license request by associating the license request from the cloud CDM with the session object generated in step 4 and sends the license request along with the session object to the UI application 32.

In step 8, the UI application 32 sends to a license server 410 the license request along with authentication and/or authorization information indicating the UI is being generated for the client device. Upon authenticating and/or authorizing the request from the cloud CDM, the license server 410 grants a license and sends the license to the UI application 32 in step 9. In step 10, the UI application 32 then sends the license to the UI engine 30 via EME messages, e.g., using the session object generated in step 4. The UI engine 30 intercepts the license and forwards the license to the cloud CDM upon identifying the session object generated in step 4. The decryptor and decoder unit 34 can then use the key in the license to decrypt and/or decode the encrypted media content and the video playback starts in step 12. The acquisition of the license allows the UI application 32 to compose UI videos using decrypted and/or decoded ABR videos, e.g., overlaying UI elements on top of ABR videos, and/or analyzing the ABR videos for determining the switch point and the switch policy.

Once the UI video is prepared, in step 13, the UI engine 30 sends the UI videos to the client device, e.g., via the WebRTC channel through the low latency player 52 (FIG. 1) to the application delegate 53 in step 13 for playout. In step 14, when the application delegate 53 detects that licenses are required for playing the UI videos, the application delegate 53 coordinates with the client CDM on the decryptor and decoder unit 58 to notify the UI application 32 of the encrypted event in steps 14 through 16. In response to receiving the notification, the UI application 32 composes an EME message for generating a license request in step 17 and creates a second session object (e.g., session object b in FIG. 4) to be associated with the license request.

Similar to step 5 on the server side, in step 18, the UI engine 30 intercepts the EME message and requests the client CDM on the decryptor and decoder unit 58 to generate a license request in step 19, and obtains the license request generated by the client CDM via the application delegate 53 (and the low latency player 52 as shown in FIG. 1) in steps 20 and 21. In step 22, the UI engine 30 packages the license request by associating the license request from the client CDM with the session object generated in step 17 and sends the license request along with the session object to the UI application 32.

In step 23, the UI application 32 sends to the license server 410 the license request along with authentication and/or authorization information indicating the license request from the client device. Upon authenticating and/or authorizing the request from the client CDM, the license server 410 grants a license and sends the license to the UI application 32 in step 24. In step 25, the UI application 32 then sends the license to the UI engine 30 via EME messages, e.g., using the session object generated in step 17. The UI engine 30 intercepts the license and forwards the license to the client CDM upon identifying the session object generated in step 17, e.g., via the application delegate 53 in step 26 and reaching the decryptor and decoder unit 58 in step 27. The decryptor and decoder unit 58 can then use the key in the license to decrypt and/or decode the encrypted media content and the video playback starts on the client device, e.g., playing the decrypted and decoded video.

Figure 6A:
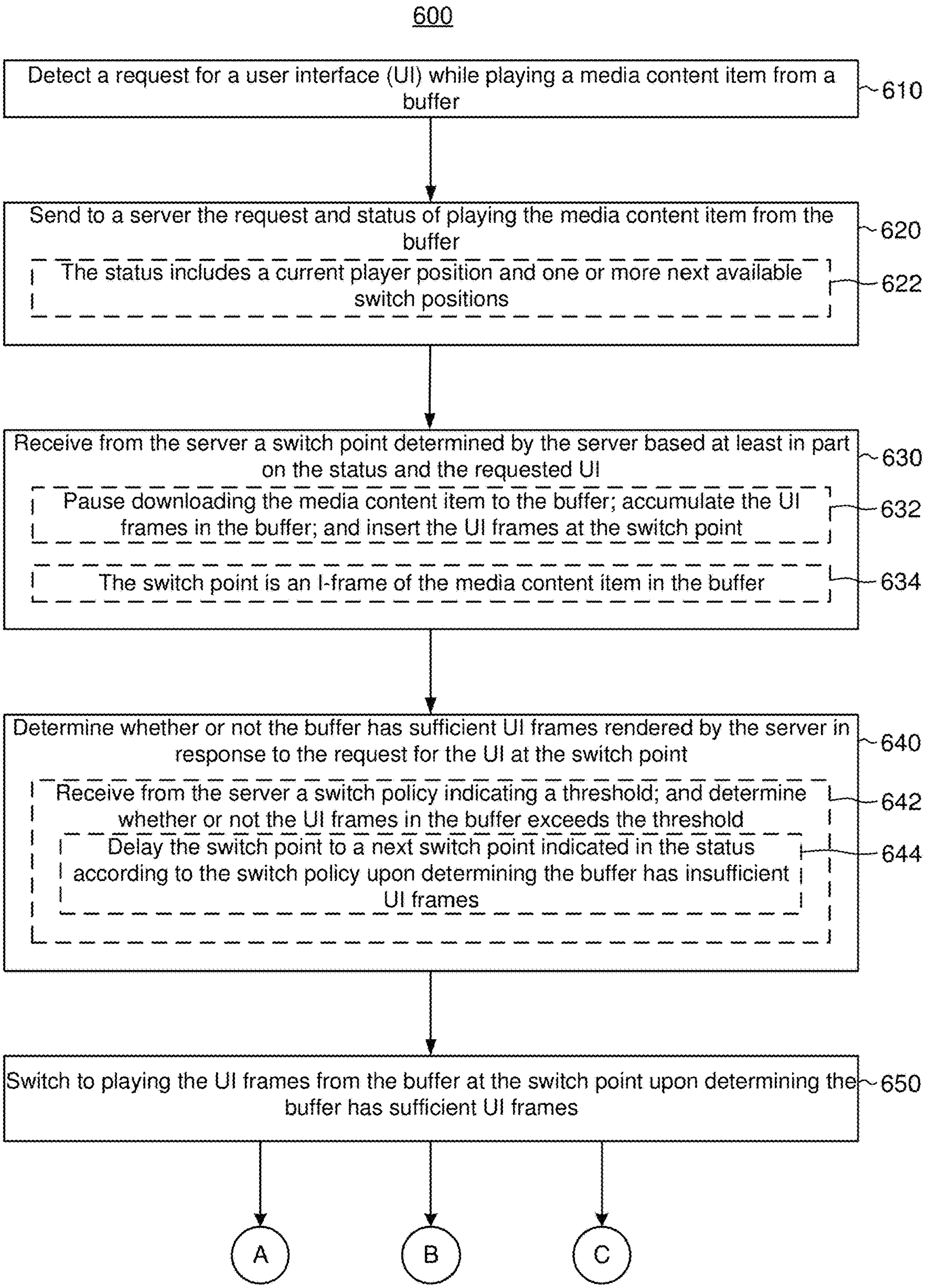

FIGS. 6A and 6B are flowcharts illustrating a client device switching method 600 in accordance with some embodiments. In some embodiments, the client device switching method 600 is performed at a client device, e.g., the client device 50 in FIG. 1, which includes a processor and a non-transitory memory. The method 600 begins with the client device detecting a request for a user interface (UI) while playing a media content item from a buffer as represented by block 610. For example, in FIG. 1, when a user at the client device 50 plays a video, e.g., a movie streamed to the client device 50 and buffered in the buffer 57 played by the ABR player 54 and outputted to the display 60 after decrypted and decoded by the decryptor and decoder unit 58, a user input to an input device coupled with the client device 50 (e.g., pressing a key on a remote) is detected by the client device, where the user input signals a request to show a UI.

As represented by block 620, upon detecting the request for the UI, the client device sends to a server the request and status of playing the media content item from the buffer. In some embodiments, as represented by block 622, the status includes a current player position and one or more next available switch positions. For example, in FIG. 2A, after receiving the user input in step 1, in step 2, the application delegate 53 obtains the buffer information from the buffer control unit 56 and reports the status of playing the media content item such as the current position (e.g., frames, segments, tracks, etc.) and the next boundaries (e.g., next random access point(s), next I-frame(s), etc. in the buffer 57) to the cloud computing platform 10 in step 3. In some embodiments, the status of playing the media content item also includes presentation conditions at the client device, such as packet loss, historical packet transmission success bitrate, decoded packet counter, successfully decoded frames, video stalls, buffer depth, CPU usage, Wi-Fi signal strength, etc. that are indicative of the client bandwidth and/or capacities.

The method 600 continues with the client device receiving from the server a switch point determined by the server based at least in part on the status and the requested UI as represented by block 630. In some embodiments, as represented by block 632, receiving from the server the switch point determined by the server based on the status and the requested UI includes: (a) pausing downloading the media content item to the buffer; (b) accumulating the UI frames in the buffer; and (c) inserting the UI frames at the switch point. For example, in steps 5 through 7 of FIGS. 2A and 2B, upon receiving the switch point and the switch policy determined by the cloud computing platform 10, the application delegate 53 instructs the ABR player to pause downloading more ABR content to free bandwidth for the UI. In some embodiments, as represented by block 634, the switch point is an I-frame of the media content item in the buffer. For example, in FIG. 3, the next available switch point at time $T_1$, $T_2$, or $T_3$ are the boundary of a respective I-frame to allow the decoder to cleanly switch context.

The method 600 continues with the client device determining whether or not the buffer has sufficient UI frames rendered by the server in response to the request for the UI at the switch point as represented by block 640. In some embodiments, as represented by block 642, determining whether or not the buffer has sufficient UI frames rendered by the server in response to the request for the UI at the switch point includes: (a) receiving from the server a switch policy indicating a threshold; and (b) determining whether or not the UI frames in the buffer exceeds the threshold. Further in such embodiments, as represented by block 644, the method 600 further includes delaying the switch point to a next switch point indicated in the status according to the switch policy upon determining the buffer has insufficient UI frames. For example, in step 8 of FIG. 2B, upon determining the UI video is not sufficiently available in the buffer 57 at the switch point, e.g., the number of UI video frames not exceeding a threshold, the buffer control unit 56 applies the switch policy in step 9 to determine what to do. As shown in FIG. 3, by applying the switch policy, client device 2 50-2 delays the switch point to $T_2$ and client device 3 50-3 delays the switch point to $T_3$.

Still referring to FIG. 6A, as represented by block 650, the method 600 continues with the client device switching to playing the UI frames from the buffer at the switch point upon determining the buffer has sufficient UI frames. For example, in FIG. 2A, upon determining that the buffer 57 has sufficient frames from the UI video, the client device switches to play the UI video in step 9.

Turning to FIG. 6B, in some embodiments, as represented by block 660, the method 600 further includes, upon determining the buffer has insufficient frames, retrieving from a cache a video to fill the buffer, playing the video from the buffer until a next switch point indicated in the status, and inserting the UI frames into the buffer at the next switch point. For example, as shown in FIG. 3, upon determining that the buffer has insufficient frames at time $T_2$, the buffer control unit takes action and fills the buffer from cached video, e.g., displaying a spinning wheel. When sufficient UI video frames accumulate in the buffer, e.g., exceeding a threshold, the buffer control unit inserts the UI video frames into the buffer at the next switch point $T_3$.

As represented by block 670, in some embodiments, the method 600 further includes establishing a data channel with the server in response to detecting the request, and sending to the server the request and the status and receiving from the server the switch point via the data channel. In such embodiments, when switching to play the UI frames from the buffer at the switch point upon determining the buffer has sufficient UI frames, the UI frames are played using the low latency player such as the WebRTC player. For example, in FIG. 1, the client device 50 creates a data channel connecting the application delegate 53 to the UI application 32 over, e.g., a WebRTC connection used by the low latency player 52. The data channel is then used by the client device 50 to pass commands between the application delegate 53 on the client device 50 and the UI application 32 in the cloud. In such embodiments, as represented by block 672, the media content item is received from the server via a channel that is different from the data channel, and a license for decrypting the media content item is obtained via the data channel in accordance with some embodiments. For example, in FIG. 1, the ABR player 54 on the client device 50 receives the ABR videos 44, e.g., using RTP protocol, and plays the ABR videos. Also as shown in FIG. 1, the client device receives UI videos from the UI application 32 via the low latency player 52, e.g., using WebRTC protocol, and plays the UI videos using the low latency player 52. Further as shown in FIGS. 1 and 4, the license for playing ABR content is received via the application delegate 32 and through the connection between the low latency player 52 and the UI application 32, e.g., using the WebRTC data channel.

In some embodiments, as represented by block 680, the server is configured to create multiple sessions, e.g., a DRM license session or a media key session, including a first DRM license session and a second DRM license session, associate the first DRM license session with a first license request from the server, wherein the server uses the first license when generating the UI frames, and associate the second DRM license session with a second license request from the device. In such embodiments, as represented by block 682, the method 600 further includes receiving a license from the server, wherein the server obtains the license from the second DRM license session. As shown in FIGS. 4 and 5, the UI engine 30 intercepts the EME APIs and directs to first the cloud CDM and second to the client device CDM via the WebRTC channel and the application delegate 53. The UI application 32 receives two license requests and requests two licenses from the license server 410. $T_0$ ensure that the correct license goes to the correct CDM, the UI engine 30 associates the correct DRM license session object with the correct CDM, e.g., attaching the first license to session object a in step 3 shown in FIG. 4 and attaching the second license to session object b in step 4 shown in FIG. 4.

Figure 7:
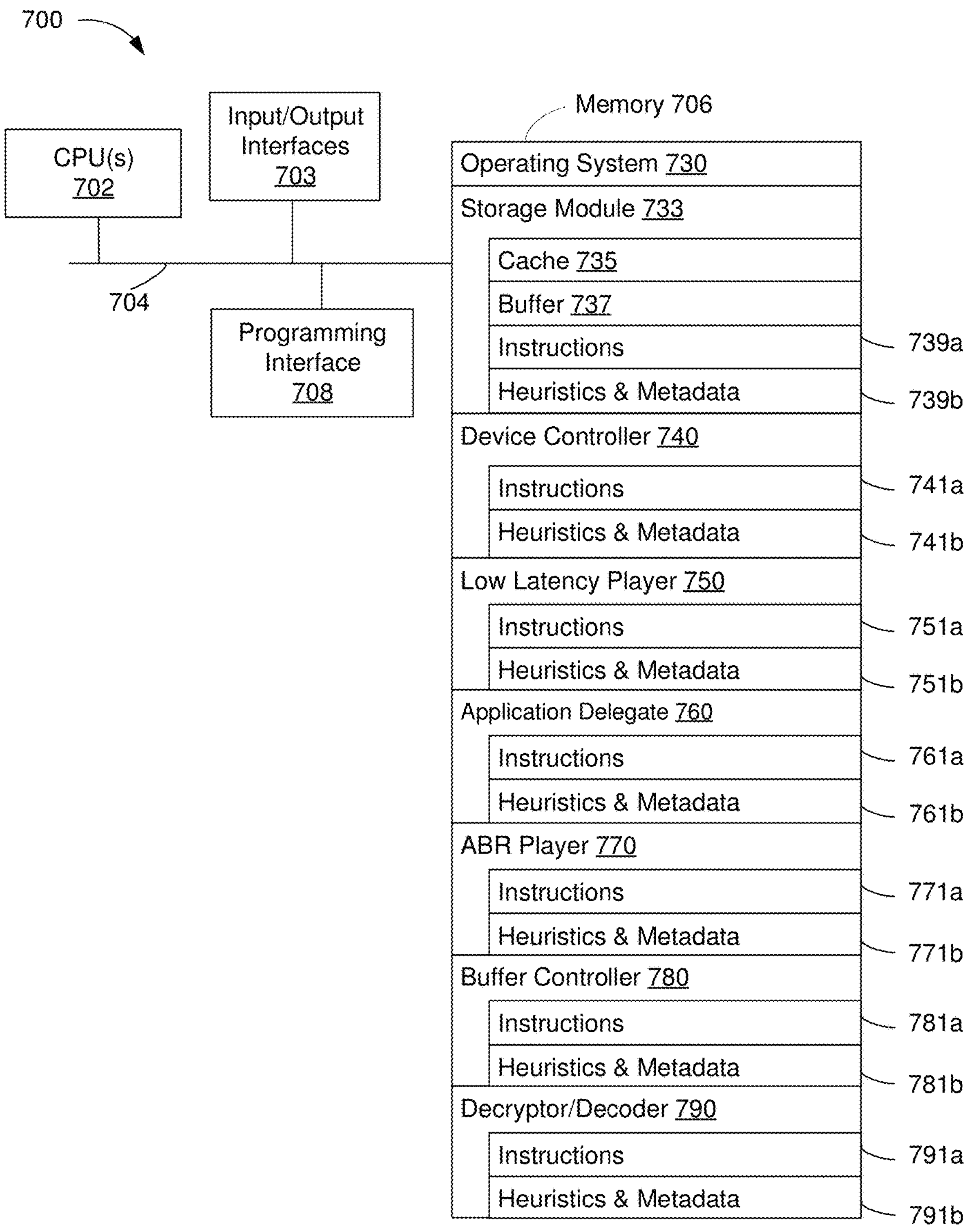
FIG. 7 is a block diagram of a computing device used for switching from buffered content to low latency content, in accordance with some embodiments.

FIG. 7 is a block diagram of a computing device 700 used for switching from buffered content to low latency content in accordance with some embodiments. In some embodiments, the computing device 700 performs one or more functions of the client device 50 (FIG. 1) and performs one or more of the functionalities described above with respect to the client device 50 (FIG. 1A). While certain specific features are illustrated, those skilled in the art will appreciate from the present disclosure that various other features have not been illustrated for the sake of brevity, and so as not to obscure more pertinent aspects of the embodiments disclosed herein. $T_0$ that end, as a non-limiting example, in some embodiments the computing device 700 includes one or more processors 702 (e.g., CPU(s)), one or more input/output interfaces 703 (e.g., input devices, sensors, network interface(s), and/or a display, etc.), a memory 706, a programming interface 708, and one or more communication buses 704 for interconnecting these and various other components.

In some embodiments, the communication buses 704 include circuitry that interconnects and controls communications between system components. The memory 706 includes high-speed random access memory, such as DRAM, SRAM, DDR RAM or other random access solid state memory devices; and, in some embodiments, include non-volatile memory, such as one or more magnetic disk storage devices, optical disk storage devices, flash memory devices, or other non-volatile solid state storage devices. The memory 706 optionally includes one or more storage devices remotely located from the CPU(s) 702. The memory 706 comprises a non-transitory computer readable storage medium. Moreover, in some embodiments, the memory 706 or the non-transitory computer readable storage medium of the memory 706 stores the following programs, modules and data structures, or a subset thereof including an optional operating system 730, a storage module 733, a device controller 740, a low latency player 750, an application delegate 760, an ABR player 770, a buffer controller 780, and a decryptor and decoder unit 790. In some embodiments, one or more instructions are included in a combination of logic and non-transitory memory. The operating system 730 includes procedures for handling various basic system services and for performing hardware dependent tasks.

In some embodiments, the storage module 733 stores data related to media content delivery, e.g., segments, frames, and/or packets received from the server. In some embodiments, the storage module 733 further includes a cache 735 (e.g., the cache 55, FIG. 1) for storing video segments corresponding to transitions to TV UIs. In some embodiments, the storage module 733 also includes a buffer 737 (e.g., the buffer 57, FIG. 1) for storing frames for content playout. $T_0$ that end, the storage module 733 includes a set of instructions 739*a* and heuristics and metadata 739*b*.

In some embodiments, the device controller 740 (e.g., the device control unit 51, FIG. 1) is configured to facilitate the establishment and maintenance of connection(s) with the server side. $T_0$ that end, the device controller 740 includes a set of instructions 741*a* and heuristics and metadata 741*b*.

In some embodiments, the low latency player 750 (e.g., the low latency player 52, FIG. 1) is configured to establish a data channel with the server side and play low latency content accumulated in the buffer 737. $T_0$ that end, the low latency player 750 includes a set of instructions 751*a* and heuristics and metadata 751*b*.

In some embodiments, the application delegate 760 (e.g., the application delegate 53, FIG. 1) is configured to receive user inputs and report the user inputs to the server side. In some embodiments, the application delegate 760 utilizes the data channel between the low latency player 750 and the server side to communicate with the server side. $T_0$ that end, the application delegate 760 includes a set of instructions 761*a* and heuristics and metadata 761*b*.

In some embodiments, the ABR player 770 (e.g., the ABR player 54, FIG. 1) is configured to obtain ABR videos and play buffered content from the buffer 737. $T_0$ that end, the ABR player 770 includes a set of instructions 771*a* and heuristics and metadata 771*b*.

In some embodiments, the buffer controller 780 (e.g., the buffer control unit 56, FIG. 1) is configured to manipulate pointers in the buffer 737 to ensure the continuous playout and to report the status of the buffer 737 to the application delegate 760. $T_0$ that end, the buffer controller 780 includes a set of instructions 781*a* and heuristics and metadata 781*b*.

In some embodiments, the decryptor and decoder unit 790 (e.g., the decryptor and decoder unit 58, FIG. 1) is configured to retrieve the frames from the buffer 737, obtains the status of the buffer 737 for playout, and decrypt and/or decode the frames for the playout. $T_0$ that end, the decryptor and decoder unit 790 includes a set of instructions 791*a* and heuristics and metadata 791*b*.

Although the storage module 733, the device controller 740, the low latency player 750, the application delegate 760, the ABR player 770, the buffer controller 780, and the decryptor and decoder unit 790 are illustrated as residing on a single computing device 700, it should be understood that in other embodiments, any combination of the storage module 733, the device controller 740, the low latency player 750, the application delegate 760, the ABR player 770, the buffer controller 780, and the decryptor and decoder unit 790 can reside on separate computing devices. For example, in some embodiments, each of the storage module 733, the device controller 740, the low latency player 750, the application delegate 760, the ABR player 770, the buffer controller 780, and the decryptor and decoder unit 790 resides on a separate computing device (e.g., each on a separate client device).

Moreover, FIG. 7 is intended more as functional description of the various features which are present in a particular implementation as opposed to a structural schematic of the embodiments described herein. As recognized by those of ordinary skill in the art, items shown separately could be combined and some items could be separated. For example, some functional modules shown separately in FIG. 7 could be implemented in a single module and the various functions of single functional blocks could be implemented by one or more functional blocks in various embodiments. The actual number of modules and the division of particular functions and how features are allocated among them will vary from one embodiment to another, and may depend in part on the particular combination of hardware, software and/or firmware chosen for a particular embodiment.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first device could be termed a second device, and, similarly, a second device could be termed a first device, which changing the meaning of the description, so long as all occurrences of the "first device" are renamed consistently and all occurrences of the "second device" are renamed consistently. The first device and the second device are both devices, but they are not the same device.

The terminology used herein is for the purpose of describing particular embodiments only and is not intended to be limiting of the claims. As used in the description of the embodiments and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting", that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The invention claimed is:

1. A method comprising:

at a client device including a processor and a non-transitory memory, wherein the non-transitory memory includes a buffer for storing content:

detecting a request for a user interface (UI) while playing a media content item from the buffer, wherein the media content item is received via a channel;

sending, via a data channel different from the channel, to a server the request and status of playing the media content item from the buffer;

receiving, via the data channel and prior to receiving UI frames, from the server signaling a switch point to switch from the media content item to a low latency UI video, wherein the switch point is determined by the server based at least in part on the status and the requested UI and corresponds to a frame;

starting to receive the UI frames and accumulating the UI frames in the buffer;

determining whether or not the UI frames in the buffer are sufficient for the low latency UI video to play at the switch point; and switching to playing the UI frames from the buffer at the switch point starting from the frame upon determining the buffer has sufficient the UI frames in the buffer are sufficient.

2. The method of claim 1, wherein the status includes a current player position and one or more next available switch positions.

3. The method of claim 1, further comprising: after receiving, via the data channel, from the server signaling the switch point, pausing downloading the media content item to the buffer; and inserting the UI frames at the switch point.

4. The method of claim 1, wherein the switch point is an I-frame of the media content item in the buffer.

5. The method of claim 1, wherein determining whether or not the UI frames in the buffer are sufficient for the low latency UI video to play at the switch point includes:

receiving, via the data channel, from the server a switch policy indicating a threshold; and determining whether or not the UI frames in the buffer exceeds the threshold.

6. The method of claim 5, further comprising:

delaying the switch point to a next switch point indicated in the status according to the switch policy upon determining the UI frames in the buffer are insufficient for the low latency UI video to play.

7. The method of claim 1, further comprising, upon determining the UI frames in the buffer are insufficient for the low latency UI video to play:

retrieving from a cache a video to fill the buffer;

playing the video from the buffer until a next switch point that is indicated in the status; and inserting the UI frames into the buffer at the next switch point.

8. The method of claim 1, further comprising:

establishing the data channel with the server in response to detecting the request; and sending to the server the request and the status and receiving from the server the switch point via the data channel.

9. The method of claim 8, further comprising:

obtaining a license for decrypting the media content item via the channel, different from the data channel.

10. The method of claim 1, wherein the server is configured to:

create multiple DRM license sessions, including a first DRM license session and a second DRM license session;

associate the first DRM license session with a first license request from the server, wherein the server uses the first license when generating the UI frames; and associate the second DRM license session with a second license request from the device.

11. The method of claim 10, further comprising:

receiving a license from the server, wherein the server obtains the license from the second DRM license session.

12. A non-transitory memory storing one or more programs, which, when executed by a processor of a client device, wherein the non-transitory memory includes a buffer for storing content, cause the client device to:

detect a request for a user interface (UI) while playing a media content item from the buffer, wherein the media content item is received via a channel;

send, via a data channel different from the channel, to a server the request and status of playing the media content item from the buffer;

receive, via the data channel and prior to receiving UI frames, from the server signaling a switch point to switch from the media content item to a low latency UI video, wherein the switch point is determined by the server based at least in part on the status and the requested UI and corresponds to a frame;

start to receive the UI frames and accumulate the UI frames in the buffer;

determine whether or not the UI frames in the buffer are sufficient for the low latency UI video to play at the switch point; and switch to playing the UI frames from the buffer at the switch point starting from the frame upon determining the UI frames in the buffer are sufficient.

13. The non-transitory memory of claim 12, wherein the one or more programs, which, when executed by the processor, further cause the device to: after receiving, via the data channel, from the server signaling the switch point, pause downloading the media content item to the buffer; and insert the UI frames at the switch point.

14. The non-transitory memory of claim 12, wherein determining whether or not the UI frames in the buffer are sufficient for the low latency UI video to play at the switch point includes:

receiving, via the data channel, from the server a switch policy indicating a threshold; and determining whether or not the UI frames in the buffer exceeds the threshold.

15. The non-transitory memory of claim 14, wherein the one or more programs, which, when executed by the processor, further cause the device to:

delay the switch point to a next switch point indicated in the status according to the switch policy upon determining the UI frames in the buffer are insufficient for the low latency UI video to play.

16. The non-transitory memory of claim 12, wherein the one or more programs, which, when executed by the processor, further cause the device to, upon determining the UI frames in the buffer are insufficient for the low latency UI video to play:

retrieve from a cache a video to fill the buffer;

play the video from the buffer until a next switch point indicated in the status; and insert the UI frames into the buffer at the next switch point.

17. The non-transitory memory of claim 12, wherein the one or more programs, which, when executed by the processor, further cause the device to:

establish the data channel with the server in response to detecting the request; and send to the server the request and the status and receiving from the server the switch point via the data channel.

18. The non-transitory memory of claim 12, wherein the server is configured to:

create multiple DRM license sessions, including a first DRM license session and a second DRM license session;

associate the first DRM license session with a first license request from the server, wherein the server uses the first license when generating the UI frames; and associate the second DRM license session with a second license request from the device.

19. The non-transitory memory of claim 18, wherein the one or more programs, which, when executed by the processor, further cause the device to:

receive a license from the server, wherein the server obtains the license from the second DRM license session.

20. A client device comprising:

a processor;

a non-transitory memory, wherein the non-transitory memory includes a buffer for storing content; and one or more programs, stored in the non-transitory memory, which, when executed by the processor, cause the client device to:

detect a request for a user interface (UI) while playing a media content item from the buffer, wherein the media content item is received via a channel;

send, via a data channel different from the channel, to a server the request and status of playing the media content item from the buffer;

receive, via the data channel and prior to receiving UI frames, from the server signaling a switch point to switch from the media content item to a low latency UI video, wherein the switch point is determined by the server based at least in part on the status and the requested UI and corresponds to a frame;

start to receive the UI frames and accumulate the UI frames in the buffer;

determine whether or not the UI frames in the buffer are sufficient for the low latency UI video to play at the switch point; and switch to playing the UI frames from the buffer at the switch point starting from the frame upon determining the UI frames in the buffer are sufficient.

* * * * *